United States Patent
Wagenaar et al.

(10) Patent No.: US 9,491,499 B2
(45) Date of Patent: Nov. 8, 2016

(54) DYNAMIC STITCHING MODULE AND PROTOCOL FOR PERSONALIZED AND TARGETED CONTENT STREAMING

(71) Applicants: Arjen Wagenaar, Amsterdam (NL); Dirk Griffioen, Arnhem (NL)

(72) Inventors: Arjen Wagenaar, Amsterdam (NL); Dirk Griffioen, Arnhem (NL)

( * ) Notice: Subject to any disclaimer, the term of this patent is extended or adjusted under 35 U.S.C. 154(b) by 25 days.

(21) Appl. No.: 14/318,751

(22) Filed: Jun. 30, 2014

(65) Prior Publication Data
US 2015/0382042 A1    Dec. 31, 2015

(51) Int. Cl.
| | |
|---|---|
| *H04N 7/10* | (2006.01) |
| *H04N 21/262* | (2011.01) |
| *H04L 29/08* | (2006.01) |
| *G06Q 30/02* | (2012.01) |
| *H04N 21/81* | (2011.01) |
| *H04N 21/258* | (2011.01) |
| *H04N 21/2668* | (2011.01) |
| *H04L 29/06* | (2006.01) |
| *H04N 21/25* | (2011.01) |
| *H04N 21/6547* | (2011.01) |

(52) U.S. Cl.
CPC .... *H04N 21/26258* (2013.01); *G06Q 30/0261* (2013.01); *G06Q 30/0269* (2013.01); *H04L 65/4084* (2013.01); *H04L 65/605* (2013.01); *H04L 67/02* (2013.01); *H04N 21/251* (2013.01); *H04N 21/25891* (2013.01); *H04N 21/2668* (2013.01); *H04N 21/6547* (2013.01); *H04N 21/812* (2013.01)

(58) Field of Classification Search
CPC .......... H04N 21/812; H04N 21/4532; H04N 7/17318
USPC .............................. 725/33–36; 709/219, 229
See application file for complete search history.

(56) References Cited

U.S. PATENT DOCUMENTS

| | | | | |
|---|---|---|---|---|
| 6,460,036 | B1 * | 10/2002 | Herz ................ | G06F 17/30867 348/E7.056 |
| 6,850,252 | B1 * | 2/2005 | Hoffberg ............ | G06K 9/00369 348/E7.061 |
| 7,751,584 | B2 * | 7/2010 | Zimmer ................ | G06T 1/0035 358/3.28 |
| 7,786,444 | B2 * | 8/2010 | Wagenaar ............. | G01T 1/1648 250/363.04 |
| 8,108,895 | B2 * | 1/2012 | Anderson ............. | G06Q 30/02 705/14.4 |
| 8,219,134 | B2 * | 7/2012 | Maharajh .......... | G06F 17/30035 455/3.01 |
| 8,492,250 | B2 | 7/2013 | Ko | |
| 8,495,675 | B1 | 7/2013 | Philpott et al. | |
| 9,124,650 | B2 * | 9/2015 | Maharajh | |
| 2004/0258053 | A1 * | 12/2004 | Toporek ............... | H04B 7/2126 370/352 |
| 2005/0165761 | A1 * | 7/2005 | Chan ................. | G06F 17/30395 |
| 2005/0195975 | A1 * | 9/2005 | Kawakita .............. | H04L 9/0822 380/30 |
| 2006/0029093 | A1 * | 2/2006 | Van Rossum ..... | G06F 17/30017 370/432 |
| 2008/0195664 | A1 * | 8/2008 | Maharajh .......... | G06F 17/30035 |
| 2010/0145777 | A1 * | 6/2010 | Ghosh .................... | G06Q 30/02 705/14.1 |
| 2011/0225417 | A1 * | 9/2011 | Maharajh ................ | G06F 21/10 713/150 |
| 2012/0005313 | A1 | 1/2012 | McGowan et al. | |
| 2014/0150019 | A1 * | 5/2014 | Ma ..................... | G06Q 30/0251 725/34 |
| 2015/0026308 | A1 * | 1/2015 | MacTiernan ..... | H04N 21/23424 709/219 |

* cited by examiner

*Primary Examiner* — Annan Shang
(74) *Attorney, Agent, or Firm* — Marc Boillot

(57) ABSTRACT

A system for dynamically rendering streaming content is provided. It includes a protocol and a dynamic stitching module to provide a personalized and targeted delivery of play list items responsive to a request made by a player. The protocol inquires the player for user profile information and includes it as part of a request to an adproxy. The inquiry requests the adproxy for recommended content based on the user profile information. The dynamic stitching module, in response to the recommended content from the adproxy then creates a manifest that is specific to the player for rendering a personalized content on the player. The manifest indicates a streaming preference for content fulfillment based on the recommended content via a redirect method or a proxy method. Other embodiments are disclosed.

21 Claims, 12 Drawing Sheets

Encoded Playlist

PART 1: http://edge//BASE64_PLAYLIST].dsm/.m3u8 ← 433 / 434

PART 2: ← 432
```
<smil>
<clip  ← 431
url="http://www.adnetwork1.com/preroll.mp4"></clip>
<clip url="http://www.example.com/gtst-s01e01.ism?vbegin=0&vend=600"></clip>
<clip
url="http://www.adnetwork3.com/midroll.mp4"></clip>
<clip url="http://www.example.com/gtst-s01e01.ism?vbegin=600&vend=1040"></clip>
<clip
url="http://www.adnetwork3.com/postroll.mp4"></clip>
>
</smil>
```

FIG. 4C
430

Manifest Example 1

```
#EXTM3U
#EXTINF:4,
/proxy/pre-audio=64k-video=256k-
1.ts?url=http://www.adnetwork1.com/
pre.mp4?cb=<url1>&cb=<url2>
#EXTINF:4,
/proxy/pre-audio=64k-video=256k-
2.ts?url=http://www.adnetwork1.com/
pre.mp4?cb=<url1>&cb=<url2>
#EXT-X-DISCONTINUITY
#EXTINF:4,
qtst-s01e01-audio=64000-video=256000-1.ts
#EXTINF:4,
qtst-s01e01-audio=64000-video=256000-2.ts
#EXTINF:4,
qtst-s01e01-audio=64000-video=256000-3.ts
#EXTINF:4,
qtst-s01e01-audio=64000-video=256000-4.ts
#EXTINF:4,
qtst-s01e01-audio=64000-video=256000-5.ts
#EXT-X-ENDLIST
```

Manifest Example 2

```
<StreamIndex Type="video" Chunks="123"
Url="QualityLevels(){....}">
<QualityLevel Index="0"/>
<QualityLevel Index="1"/>
<QualityLevel Index="2"/>
<!-- Preroll -->
<c t="0" d="40000000" r="5"/>
<c t="0" d="20000000"/>
<!-- first 10 minutes of presentation -->
<c t="220000000" d="40000000" r="150"/>
</StreamIndex>
```

DYNAMIC STITCHING MODULE AND PROTOCOL FOR PERSONALIZED AND TARGETED CONTENT STREAMING

FIELD OF THE INVENTION

The embodiments herein relate generally to content delivery and streaming over the Internet, and more particularly to, targeted advertisement and personalization of content.

BACKGROUND

Adaptive bit-rate streaming (ABR) is an established technique used in streaming multimedia over computer networks and communication devices. Whereas previous video streaming technologies utilized streaming protocols such as RTP with RTSP, more recent adaptive streaming technologies are mostly based on HTTP and designed to work efficiently over large distributed HTTP networks such as the Internet.

ABR works by a player client detecting bandwidth and central processing unit capacity in real-time and adjusting the quality of a video stream in accordance with the detected information. For Live streams it requires the use of an encoder which can encode a single source video at multiple bit rates. The player client switches between streaming the different encodings depending on available resources. This results in less buffering, faster start times and a better experience for both high-end and low-end connections. ABR as been fundamental in supporting streaming content delivery.

One of the key drivers in reducing the time going from Live streams to video on demand (VOD) is the time consumed in making the clips and removing specific content like advertisements. Current content preparation processes are time consuming and require manual intervention to make the Live streams available for VOD replay. The time-to-view will further increase and you may miss an important moment for monetization. Unified Capture (discussed below) makes this possible.

The 1:1 targeting problem is widely understood as difficult to solve for all ABR streaming protocols simultaneously that are currently in use (HLS, HDS, ISS, DASH). Targeting in ABR streaming is to present individual viewers with personalized streams, as for instance advertisement combined with content, on a large scale in a unified way. As ABR streaming becomes more and more prevalent a solution for this problem becomes more and more valuable; for example, in advertisement, which is one of the use-cases for 1:1 targeting. A need can therefore be appreciated for targeting streams individually in a unified manner to enhance customer value.

SUMMARY

The invention disclosed herein may be incorporated in the aforementioned embodiments illustrated in FIGS. 1A-1C, or separately as a standalone module, unit, program, process, system or method. As will be presented ahead, the disclosed invention addresses the difficulty of targeting ABR streaming to present individual viewers with personalized streams, for instance, an advertisement combined with a program, on a large scale in a unified way. The 1:1 targeting problem is widely understood as difficult problem, particularly solutions that solve for all ABR streaming protocols simultaneously that are currently in use (e.g., HLS, HDS, ISS, DASH).

In a first embodiment, a system for dynamically rendering streaming content is provided. The system includes a protocol and a dynamic stitching module, that, through implementation of the protocol by a player, communicatively coupled thereto, provides a personalized and targeted delivery of play list items from an adproxy responsive to a request made by the player. The player by way of the protocol: i) inquires the player for user profile information and ii) provides the user profile information with the request to the adproxy for the personalized and targeted delivery of play list items. Furthermore, by way of the protocol, the player receives from the adproxy a playlist of the personalized and targeted delivery of the play list items responsive to the requesting, where the playlist includes a personalized content having at least one inserted ad reference. It creates an encoded playlist from the playlist received from the adproxy, and then communicates the encoded playlist in a request to the dynamic stitching module. The dynamic stitching module translates the encoded playlist into a manifest that is specific to the player for rendering the personalized content on the player, and provides the manifest file to the player to resolve one or more manifest streams against a content server and an adserver for delivery of the personalized content.

In a second embodiment, a method of dynamically rendering streaming content is provided. The method includes the steps of requesting through a player a personalized and targeted delivery of play list items from an adproxy, where the requesting includes: i) inquiring the player for user profile information and ii) providing the user profile information with the request to the adproxy for the personalized and targeted delivery of the play list items. The adproxy returns a playlist to the player for the personalized and targeted delivery of play list items responsive to the request. The playlist includes a personalized content having at least one inserted ad reference. The player creates an encoded playlist from the playlist received from the adproxy and communicates the encoded playlist in a request to a dynamic stitching module for translation of the encoded playlist into a manifest. The dynamic stitching module creates from the encoded playlist the manifest specific to the player for rendering the personalized content on the player. This module then provides, or updates, the manifest provided to, or received by, the player to resolve one or more streams identified in the manifest against a content server and an adserver for delivery of the personalized content In a third embodiment, a system for dynamically rendering streaming content is provided that includes a protocol and a dynamic stitching module to provide a personalized and targeted delivery of play list items responsive to a request made by a player. The protocol inquires the player for user profile information and provides it as part of a request to an adproxy. The inquiry includes a request for recommended content based on the user profile information. The dynamic stitching module, in response to the recommended content from the adproxy, creates a manifest that is specific to the player for rendering a personalized content on the player. The manifest also indicates a streaming preference for content fulfillment based on the recommended content via a redirect method or a proxy method.

BRIEF DESCRIPTION OF THE DRAWINGS

The features of the system, which are believed to be novel, are set forth with particularity in the appended claims. The embodiments herein, can be understood by reference to the following description, taken in conjunction with the accompanying drawings, in the several figures of which like reference numerals identify like elements, and in which:

FIG. 4C is an exemplary encoded playlist in accordance with one embodiment;

FIG. 4D is an exemplary manifest for HLS in accordance with one embodiment;

FIG. 4E is an exemplary manifest for Smooth in accordance with one embodiment.

DETAILED DESCRIPTION

Figure 1A:
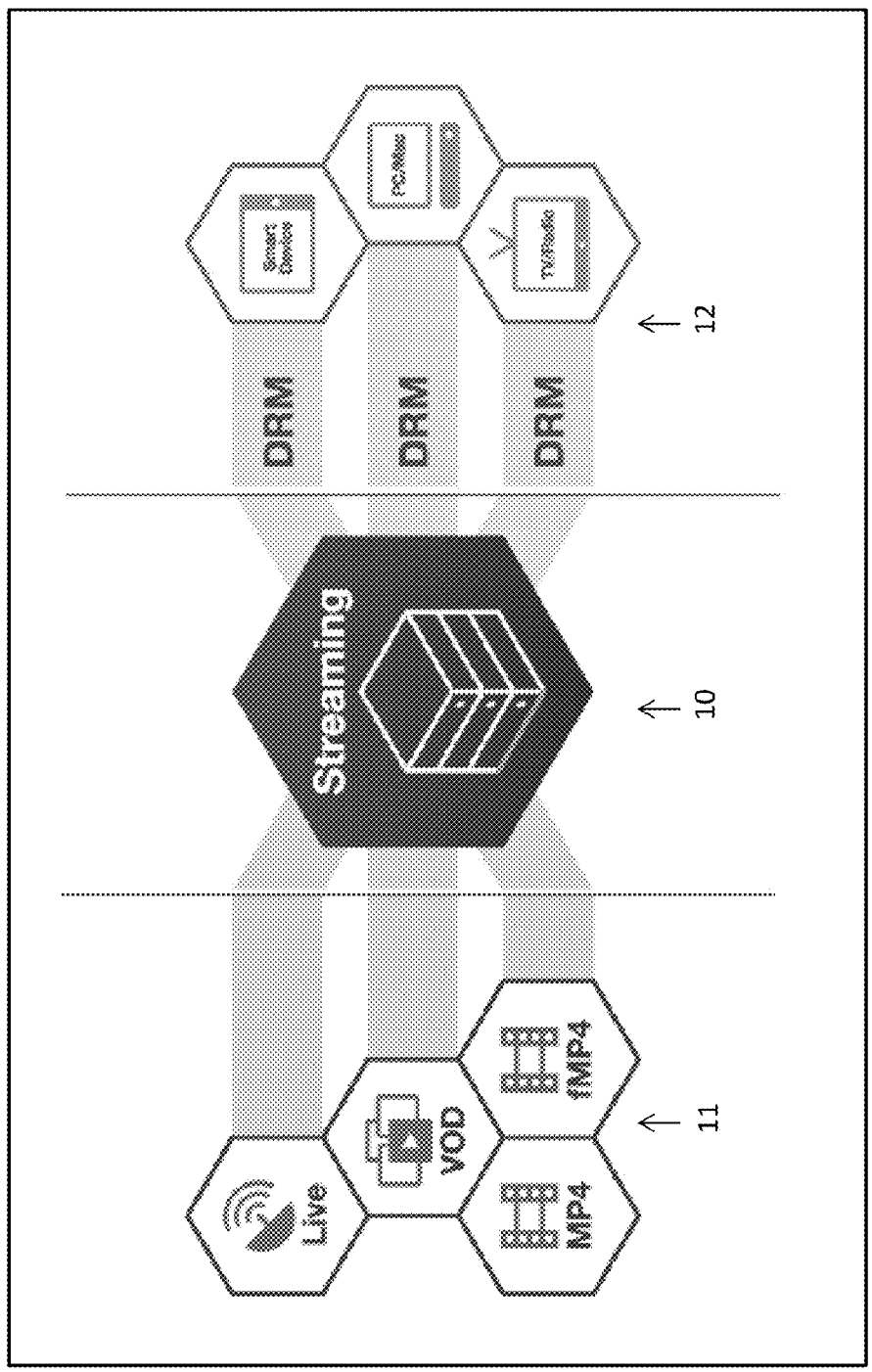
FIG. 1A is a Unified Streaming module for personalized and targeted streaming in accordance with one embodiment.

While the specification concludes with claims defining the features of the embodiments of the invention that are regarded as novel, it is believed that the method, system, and other embodiments will be better understood from a consideration of the following description in conjunction with the drawing figures, in which like reference numerals are carried forward.

As required, detailed embodiments of the present method and system are disclosed herein. However, it is to be understood that the disclosed embodiments are merely exemplary, which can be embodied in various forms. Therefore, specific structural and functional details disclosed herein are not to be interpreted as limiting, but merely as a basis for the claims and as a representative basis for teaching one skilled in the art to variously employ the embodiments of the present invention in virtually any appropriately detailed structure. Further, the terms and phrases used herein are not intended to be limiting but rather to provide an understandable description of the embodiment herein.

Briefly, the terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "suppressing" can be defined as reducing or removing, either partially or completely. The term "processing" can be defined as number of suitable processors, controllers, units, or the like that carry out a pre-programmed or programmed set of instructions.

As used herein, the term "ad" is short notation for advertisement which can mean any form of paid or non-paid solicitation, marketing, information, material or notice promoting a product, service, event, activity or information. The terms "program" and "protocol" are intended to broadly mean a sequence of instructions or events for the performance of a task, which may be executed on a machine, processor or device.

The term "streaming", "streaming media", and "streaming media protocol" are intended to broadly encompass any media program or protocol including at least digital video and/or digital audio content which can be rendered and played by a rendering device at the receiving end of one or more wired or wireless data connections. Streaming media or streaming media programs can be audio programs and/or music, video on demand programs, linear video programs, live video programs or interactive programs and can be transported through the data network in any suitable manner as will occur to those of skill in the art.

The term "play list items" is intended to mean individual media content items. The term "playlist" is intended to mean a combination of chosen items selected from play list items including personalized content, where the personalized content includes advertising content or additional media not originally identified in the play list items.

The term "viewer" is intended to mean in one case a person that receives or provides user feedback and in another case a device or electronic communication display that visually presents information which the person views. The term "player" is intended to mean a software program or device that visually presents or exposes media with or without media functionality or interaction to a viewer/person. The term "plug-in" is intended to mean a software component that that adds a specific feature to an existing software application, for example, a player. The terms "origin" and "content server" are intended to mean similarly a repository for multimedia, business forms, documents, and related data, along with metadata, that allows users to process and work with the above content or media. The term "profile" is intended to mean information related to personal or public data associated with a specific user, software program, application, mobile app, user interface, desktop, network, server, or a customized user environment. The term "local" is intended to mean information associated with a user (person), user device or service, for example, geographic location of the user, or geographic location of an advertised service or event, or other information including but not limited to business identifier, network identifier, mobile device identifier, or logon profile.

As used herein, the term "manifest" and "mezzanine" is intended to broadly include manifests, for example, as defined by the HLS protocol, media presentation descriptions (MPDs) as defined by the MPEG-DASH protocol or any other data structure or method for sufficiently describing the contents of a streaming media program, at one or more resolutions, for playback through a network. Also as used herein, the term URI is meant to broadly include any suitable method of identifying data available for access through a network, such as the URIs defined in the IETF RFC3986 "Uniform Resource Identifier (URI): Generic Syntax", or any other suitable mechanism, system or method for identifying such data.

Furthermore, as used herein the term "inserted content" and/or "dynamically inserted content" is intended to comprise any media content, video and/or audio, which it is desired to insert into a streaming media program. While the most common example of inserted content may be advertising programming, it is also contemplated that other content can be inserted, if desired, and such inserted content can include: alternate endings to streaming media programs; substitution of program durations with other programs or black screens such as for sports "blackouts"; changes to scenes or portions of scenes within a streaming media program; TV-like "channel surfing" through available streaming media programs, live or on demand, where the inserted content is the streaming media program on the channel the user switches to; etc. Further, inserted content can be overlay content displayed or played in combination with the main program. Such overlay content can also be interactive content and the use of such content is described in published U.S. patent application 2011/0145858, assigned to the assignee of the present invention.

FIG. 1A is a high-level diagram for an exemplary embodiment illustrating a Unified Streaming Module 10. The Unified Streaming Module 10 streams media content from one unified source 11 (e.g., Live, VOD, MP4, etc.) to multiple clients and devices 12 (e.g., smart device, PC/Mac, TV/Radio, etc.). In one arrangement, it wraps the platform specific solutions available from Apple® (HTTP Live Streaming), Adobe® (HTTP Dynamic Streaming) and Microsoft® (Smooth Streaming) as well as MPEG_DASH into one. While the following and foregoing discussions refer, as an example, to the protocols above, and those proposed by Apple® in an IETF draft RFC, and to MPEG-2 transport streams being transmitted with that protocol via a TCP/IP network, it will be apparent that the foregoing disclosed invention is not so limited. Instead the disclosed invention can be employed in the embodiments contemplated herein with a wide variety of streaming protocols and network protocols for delivering streaming media programs. The MPEG-DASH protocol, developed by the MPEG consortium, is another example of a streaming media protocol with which the present invention can be employed and other suitable protocols exist or may be developed in the future.

The Unified Streaming Module 10 unifies platform specific solutions thereby solving complex matters like: content and storage management, ever growing storage, content protection, closed captions and workflow. The Unified Streaming Module 10 only requires use of one of each; namely, one source file, one consistent way of protection using several Digital Rights Management files (DRM)'s, one caption file and one workflow for all formats. One novel and distinguishing feature of the Unified Streaming Module 10 to eliminate the platform specific complexity is the unified (server) manifest file as will be described ahead in further detail.

The Unified Streaming Module 10 can be a software plug-in that can be used with industry standard webservers like Apache®, Nginx®, Microsoft® IIS and Lighttpd®. The webserver takes one format as ingest (fMP4, MP4) and transmuxes in real-time to all formats, including Progressive and HbbTV®. It supports DRM schemes such as PlayReady®, Adobe® Access, Marlin and AES. To offer maximum flexibility, DRM is supported in 3 ways: playout of pre-encrypted content, encrypt clear content in real-time and playout of pre-encrypted content using another type of DRM altogether, herein called trans DRM. Common encryption (CENC) is also supported. Both CENC and trans DRM allow for a flexible approach towards a DRM provider. In addition to the above, Unified Streaming supports advanced audio like DTS Express and Dolby® Digital Plus or subtitles/captions using DFXP/TTML, ISMT and WebVTT.

Figure 1B:
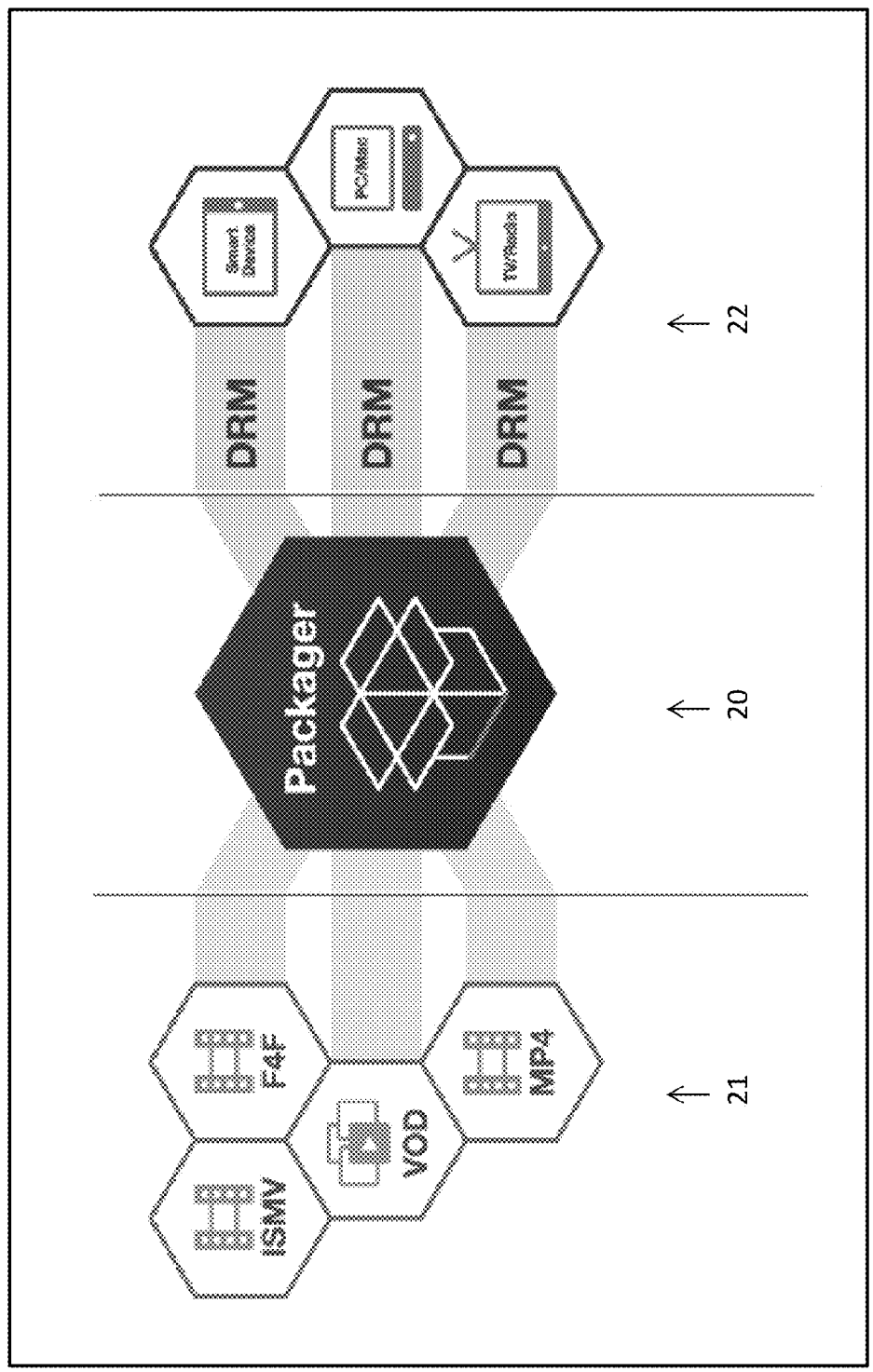
FIG. 1B is a Unified Packager module for personalized and targeted streaming in accordance with one embodiment.

The Unified Streaming Module 10 provides/performs the following features/services:
  Online workflow for segmentation, packaging and encryption
  One workflow for all delivery formats
  Supports all leading delivery formats: HDS, HLS, MSS and MPEG-DASH
  One ingest format
  Module for industry standard webservers
  Support advanced audio features
  Supports encryption and DRM
  Easy integration in your workflow
  Reduces storage requirements
  Storage agnostic
  TCO friendly reusing existing infrastructure FIG. 1B is a high-level diagram for an exemplary embodiment illustrating a Unified Packager Module 20. It packages media content from one ingest format 21 (e.g., ISMV, F4F, MP4.) to output formats suitable for multiple clients and devices 22 (e.g., smart device, PC/Mac, TV/Radio, etc.). It so solves challenges associated with the traditional packaging tools and provides fast and easy packaging for all formats. The Unified Packager Module 20 operates as one tool to prepare content for HDS, HLS, MSS (Smooth) and MPEG-DASH. In combination with content protection schemes like token based access and DRM, Unified Packager Module 20 prepares content for optimal user experience. Once packaged, the content can be delivered to an origin server or to a CDN for wider distribution as will be discussed ahead.

Figure 1C:
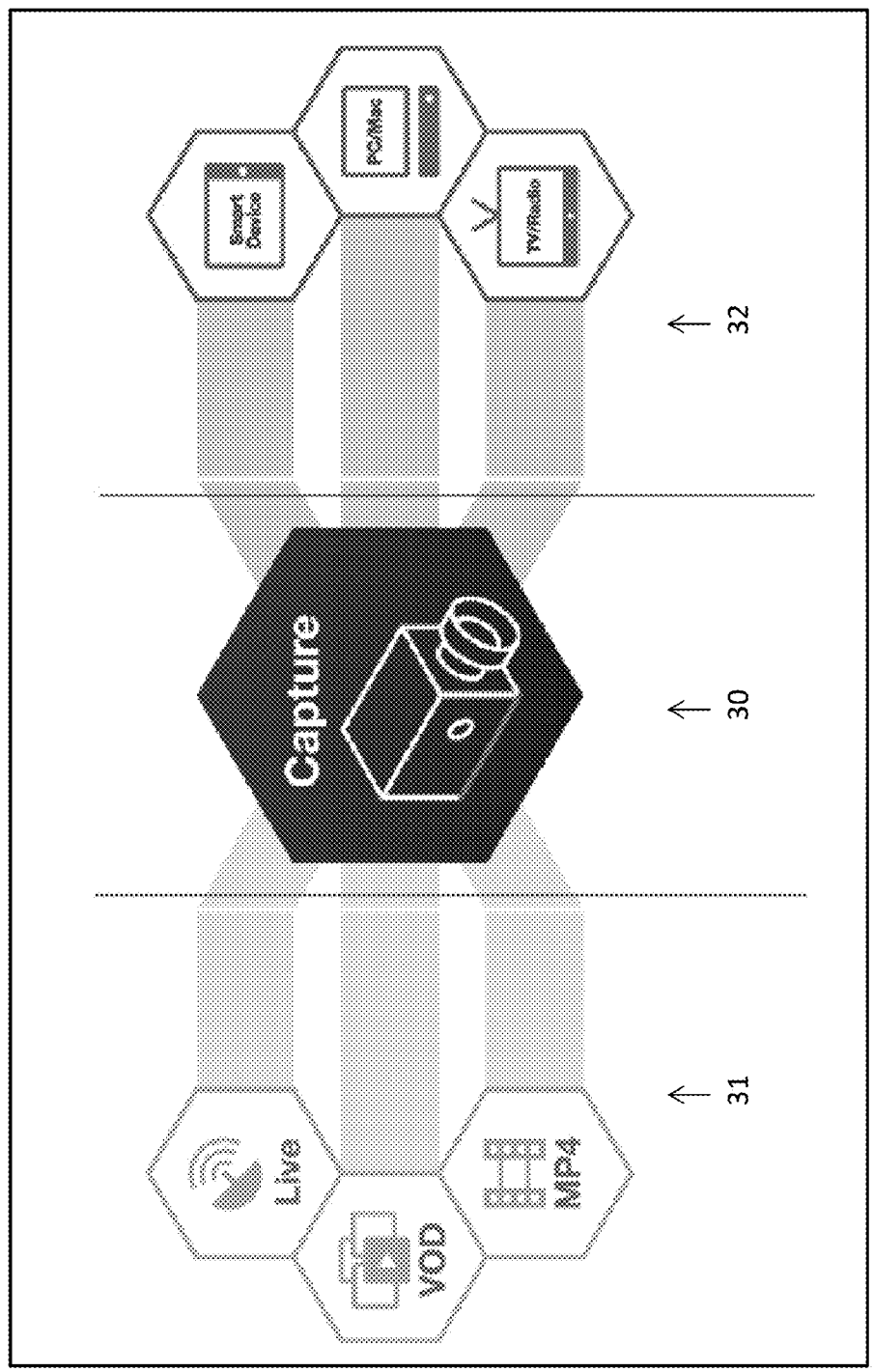
FIG. 1C is a Unified Capture module for personalized and targeted streaming in accordance with one embodiment.

The Unified Packager Module 20 supports various formats and streaming solution options that traditionally impact packaging performance and quality. It uses one ingest format, providing optional encryption and DRM, and packaging files for all formats (e.g., HLS, HDS, MSS (Smooth) and MPEG-DASH). In one configuration, Unified Packager Module 20 uses MP4 files to produce segmented output in HDS, HLS, MSS and MPEG-DASH formats. Using advanced options for additional audio and/or DRM is handled via a straightforward command line. The Unified Packager Module 20 can be integrated in existing workflows and content management systems. It provides/performs the following features/services:
  Offline workflow for segmentation, packaging and encryption
  One workflow for all delivery formats
  Supports all leading delivery formats: HDS, HLS, MSS and MPEG-DASH
  One ingest format
  Support advanced audio features
  Supports encryption and DRM
  Easy integration in your workflow
  Storage agnostic FIG. 1C is a high-level diagram for an exemplary embodiment illustrating a Unified Capture Module 30. It captures media content from one stream 31 (e.g., Live, VOD) to file, to be used for multiple clients and devices 32 (e.g., smart device, PC/Mac, TV/Radio, etc.). It provides frame accurate recording and powerful ways to enable content replacement and Advertisement (hereinafter "Ad") insertion. As an example, the Unified Capture Module 30 creates VOD clips from any stream format and in addition performs frame accurate cutting. It can be integrated in a workflow providing support for HLS, HDS, MSS and MPEG-DASH clips resulting in a consistent viewer experience on all screens. Once captured, media content is delivered instantly to an Origin server or to a CDN for wider distribution. This may further reduce the time-to-view providing more options for monetization or personalized recording services (nPVR).

The Unified Capture Module 30 downloads the adaptive bit-rate presentation to disk (or storage) and provides the option to do frame accurate cuts in-stream. It can capture streams generating VOD content in Adobe® HTTP Dynamic Streaming (HDS), Apple® HTTP Live Streaming (HLS), Microsoft® Smooth Streaming and MPEG-DASH formats. The Unified Capture Module 30 provides content replacement with in-stream cuts, offering a seamless transition between frames. It can be integrated in existing workflows including Ad servers and with Content Management Systems (CMS). It provides/performs the following features/services:

One workflow for all formats
Captures multi format streams over HTTP or directly from disk
Support for HDS, MSS, HLS and MPEG DASH
Support for encrypted and un-encrypted streams
Easy integration in your workflow.

Figure 2:
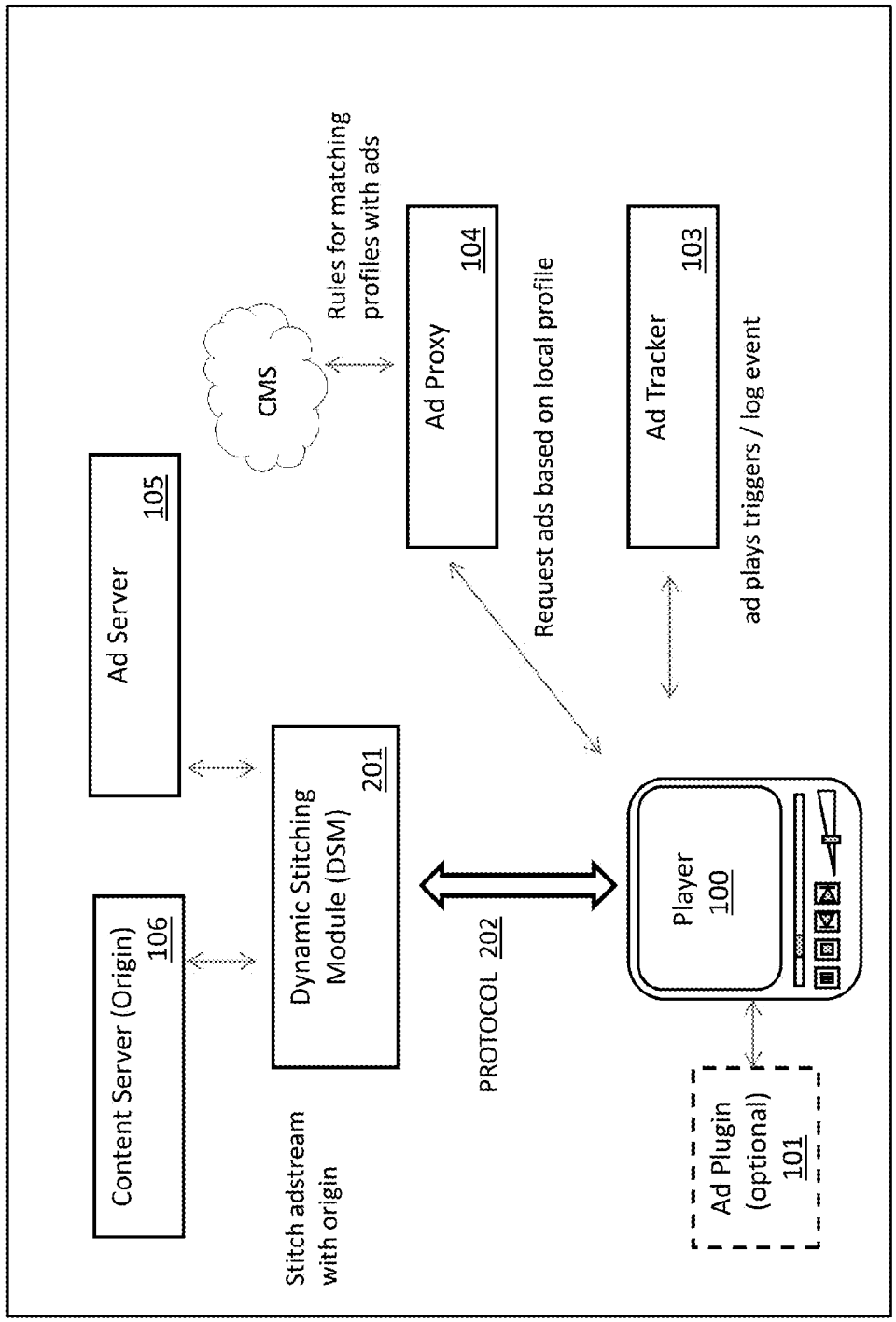
FIG. 2 shows a diagrammatic illustration of a system comprising inventive modules for dynamically rendering streaming content in accordance with one embodiment.

FIG. 2 shows a diagrammatic illustration of a system 200 comprising inventive modules for dynamically rendering streaming content in accordance with one embodiment. The inventive modules of the system 200 include a dynamic stitching module 201 and a protocol 202. The dynamic stitching module 201 (hereinafter "DSM") runs on a server that communicates with the player 100 over a wired or wireless communication link. The player 100 establishes communication with the DSM 201 either directly, for example, through a programming interface on the player 100, or indirectly, for example, by way of an ad plug-in 101 (optional) to the player 100. The player 201 communicates with the DSM 100 by way of the protocol 202 to request, receive and render personalized and targeted media content, for example, media content with custom inserted advertisements. Implementation of the protocol 202 facilitates coordination and communication, by and between the adproxy 104, the adserver 105 and the content server (origin) 106 with the DSM 201 and player 100 to facilitate the delivery of the personalized and targeted media content.

The DSM 201 provides, by way of the protocol 202, personalized and targeted media content to the player 100, for example, streaming audio, video and media, with dynamically inserted content (e.g., advertisements) by way of the protocol 202, responsive to a request by the player 100, for instance, when a user of the player 100 selects to download, capture, or view media content, such as, on a mobile device, laptop or other communication device. As will be explained ahead, the protocol 202 provides for media communication and control between the DSM 201, the player 100, and other components: the adtracker 103, the adproxy 104, the adserver 105 and the content server (origin) 106. Implementation of the protocol 202 provides for the rendering of streaming content between the DSM 201, the player 100 and these other components.

Briefly, the adproxy 104 is an advertisement server that provides links to advertisement content, for example, marketed media from an advertiser such as video clips and sound clips. The adproxy 104 does not store the actual advertisement content but rather provides contact information, for example, internet address links, or resource locators, for retrieving the advertisements, which are presented in the playlist. The ad server 105 provides the source storage of the advertisement content. Responsive to an inquiry for advertisement content, the ad server 105 will deliver (or stream) the advertisement content to the requesting entity.

The ad tracker 103 provides advertisement play triggers and logs events allowing for in-market research that monitors ad viewing and content presentation. The content server 106 provides the (non-advertising) raw media content, for example, the video clips and sound clips in raw digital format (e.g., MP3, MP4, .mov, .wav, etc.) requested by the player 100.

Figure 3A:
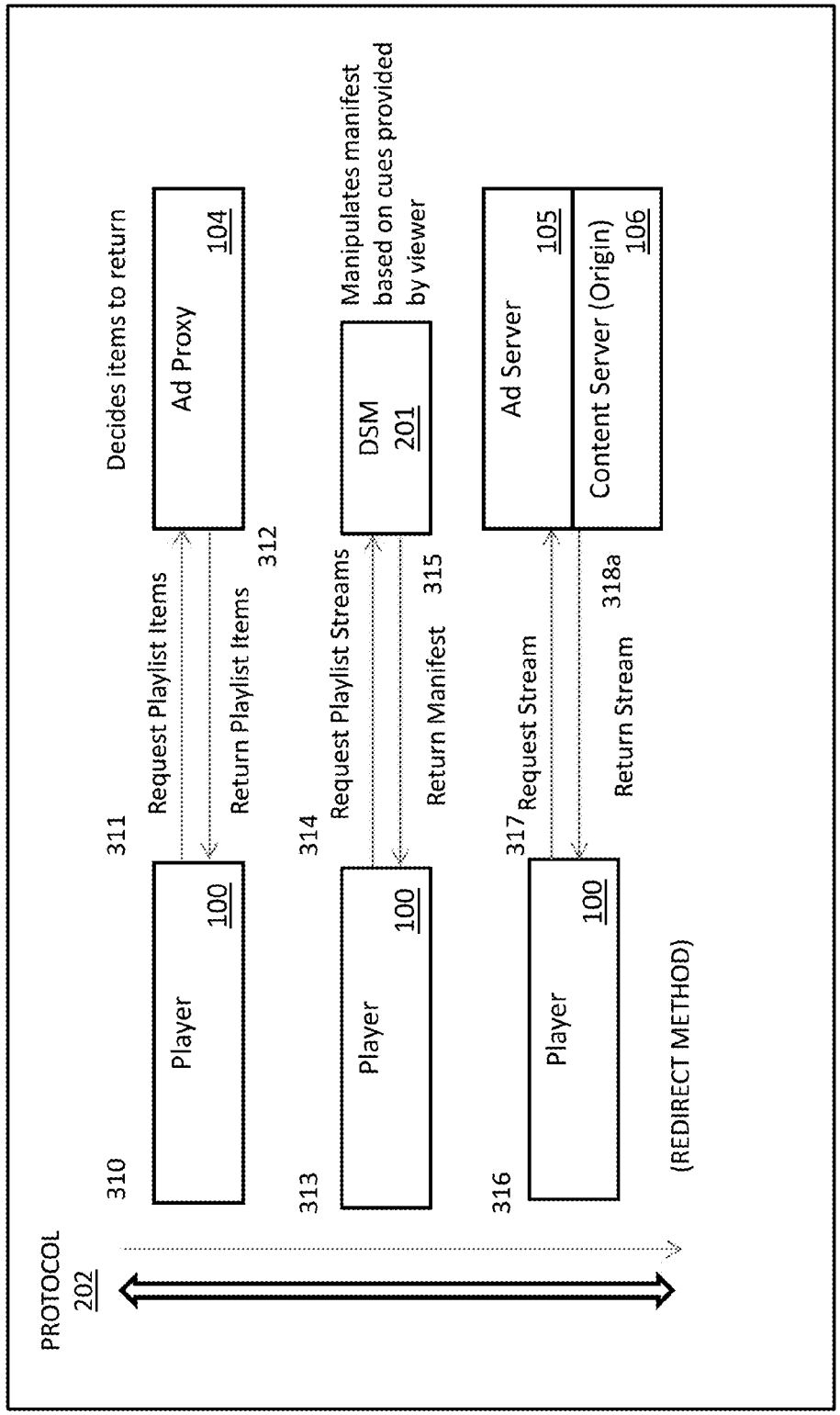
FIG. 3A illustrates a sequence diagram of a redirect method for dynamically rendering streaming content by way of the system in accordance with one exemplary embodiment.

FIG. 3A illustrates a sequence diagram of a method 300 for dynamically rendering streaming content by way of the system 200 in accordance with one exemplary embodiment. The method 300 may include more or less than the number of steps shown. When describing the method 300, reference will be made to FIG. 2 and FIGS. 4A-4E for identifying components or modules of the system 200 that practice, implement, or illustrate, the method steps. Moreover, each described step may be implemented by, or offloaded to, a separate module. The method 300 can also be practiced in any other suitable system or device. It can also have a greater number of steps or a fewer number of steps than those shown in FIG. 3A.

The method 300 can start in a state 310 where a user of the player 100 requests one or more play list items to be played on the player 100. An exemplary list of play list items 410 is presented in FIG. 4A. The play list items may be a static user selection list of available clips where the player selects itself, or alternatively, where the player 100 dynamically sends off key data (for instance user id, what content clip is requested etc) to receive a playlist presented to the user: a combination of chosen items to be displayed. The user manually selects the media items (e.g., video clip, newsfeed, etc.), for example, from a drop down menu, a selection list or other interactive component, by touchpad or keypress. Understandably, the player 100 can include any type of user interface coupled with the host device to provide for a selection of the media, for example, a mobile phone, computer, television or display. The player 100 selects the play list items 410 responsive to the user selection.

At step 311, the player 100 sends a request for a targeted and personalized delivery of the play list items 410 to the adproxy 104. The adproxy 104 can include logic and/or rules for matching advertisements with requests, including, requests from the player 100 to match provided user input information with advertisements. This allows the player 100, by way of the protocol 201, to request, from the adproxy 104, recommended content for advertisements in view of the user profile information, for example, based on these existing decision logic or rules. A recommendation may be what type of content to include based on association with the user profile (e.g., ratings, priority, schedule, etc.). These rules can be provided or implemented, for example, by a Content Management System (CMS) operatively coupled thereto.

As part of the request, the player 100 inquires itself for user profile information and provides this information with the request for personalized and targeted delivery of the play list items 410. This "client-side" reversal of logic is unique in that it is the player 100 inquiring information about itself. In this arrangement, the player 100 can also inquire the host device on which the player 100 runs, or programs communicatively coupled thereto in the host device and the player 100, for user profile information available to, or collected by, or previously from, these components. The user profile information can include personal data, personal identifiers, use history, previous viewing history, ad history from other program sources or from data the player 100 itself collects on the user, or any other data associated with or relating to the user. As an example, the user profile information can be retrieved from an internet browser, cookies, plug-ins, social network programs or mobile device apps resident on the host device of the player 100. The user profile information can also include local information, for example, global positioning information, network identifiers, wireless groups and demographic data, or other user or device identifying data.

At step 312, the adproxy 104 in response to the request from the player 100 reviews the play list items in view of the user profile information and responds with a "playlist". This playlist includes personal and targeted media content based on the user profile information received. An exemplary playlist 420 is presented in FIG. 4B. Notably, the playlist 420 includes not only the play list items 410 provided by the player 100 transmitted in the request, but in addition, personalized and targeted content specific to the user that is based on the user profile information provided therewith. As an example, the adproxy 104 includes one or more links to an ad reference 421 in the playlist 420 related to the user profile information; for instance, an ad targeted to the user's location, preferences, or status. In one arrangement, it is the player 100 that, by way of the protocol 202, requests and receives, from the adproxy 104, decision of advertisement insertion in the personalized content based on the user profile information. The decision can be how long of an ad clip to insert, where to insert it, how many to insert and other timing information. Recall, the player 100 performs a logic reversal that requests from the adproxy 104 a recommended content for the play list items according to the user profile information.

Retuning to method 300, at step 313, the player 100 then creates an encoded playlist from the playlist 420 received from the adproxy 104. An encoded playlist 430 in one exemplary embodiment is presented in FIG. 4C. At a high-level, the adproxy 104 takes each link (or reference) in the playlist 420 and combines them together to create a parseable URL string (Part 1 with Part 2; see FIG. 4C) that can be communicated over the internet. In one arrangement, the player 100 creates the encoded playlist 430 with Uniform Resource Locators (URLs) which fetch the personalized content of the playlist and the at least one inserted ad reference, though other resource indicators may also be used without departing from the scope of the invention herein.

At a lower-level, the player 100, through implementation of the protocol 202, converts characters of strings in the playlist into parseable URL strings that are appended together. In a preferred embodiment, a base 64 encoding format is used for this string conversion, though other conversions are supported, such as, hex. The string conversion also includes attaching a first extension 433 and a second extension 434 to the URL as shown in Part 1 (see FIG. 4C). The first extension 433 (e.g., see .dsm in Part 1) indicates that the content listed further below in Part 2 (shown below) of the encoded playlist 430 should be processed by the DSM 201 for generating a manifest, which will be explained in following steps.

The second extension 434 (e.g., see .m3u8 in Part 1 of FIG. 4C) identifies the media format supported (or requested) by the player 100 (e.g., m3u8, .f4m, etc. After the string conversion, the encoded playlist 430 effectively becomes a URL containing a base64 encoded playlist ending with the first extension 433 .dsm (signalling the DSM 201 handler to the webserver) followed by the second extension 434 for the stream type indicator (HLS:/.m3u8, Smooth:/manifest, HDS:/.f4m, MPEG_DASH:/.mpd). Without the string conversion special characters (e.g., &, $, etc.) could not effectively be communicated over an HTTP request.

Continuing with method 300, at step 314, the player 100 communicates the encoded playlist 430 in a request to the DSM 201. In one embodiment, the player 100 is communicatively coupled to an ad plug-in (101) that by way of the protocol 202 signals the DSM 201 with the encoded playlist using Synchronized Multimedia Integration Language (SMIL) (see 431 in FIG. 4C). Other signaling means are also contemplated that can be implemented in other languages without departing from the novel aspects disclosed herein. As indicated above, the player 100 communicates the encoded playlist 430 in a request to the DSM 201 which identifies the player 100 and rendering formats supported by the player. Recall, it also appends a filename extension onto the encoded playlist 430 to inform the DSM 201 of a media format type supported by the player 100.

At step 315, the DSM 201 in response to the request, creates a manifest specific to the player with personalized and targeted content for rendering on the player 100. For illustrative purposes, a manifest 440 in one exemplary embodiment is shown in FIG. 4D, although it should be noted other variants with more or less content may be generated. This exemplary manifest returned to the player 100 by the DSM 201 is for an HTTP Live Streaming (HLS) request with format m3u8. FIG. 4E shows another exemplary manifest 450 returned to the player 100 by the DSM for a Smooth Manifest request with format/manifest, although it should be noted other variants with more or less content may be generated. The DSM 201 translates the encoded playlist 430 into the manifest 440 and combines the play list items in the playlist for delivery as one content stream for specified rendering on the player 100. It does this by stitching together the media content described in the encoded playlist 430 for rendering the personalized content into the manifest 440 as a single stream 432. This stitching combines the separate media content from the encoded playlist 430 with the advertisements 421 of at least one inserted ad reference of the inserted media depending on the selected player and media format.

As will be explained shortly ahead in further detail, the translation of the encoded playlist 430 to the manifest 440 also indicates how content will be streamed to the player 100; namely, whether the streaming is 1) redirected, or 2) proxied. That is, the DSM 201 includes an indication in the manifest 440 (encoded in the single stream) deciding the manner of delivery content to the player 100. That is, a streaming preference is indicated for content fulfillment based on the recommended content via the redirect method or the proxy method. It can also select from streaming protocols simultaneously that are currently in use (e.g., HLS, HDS, ISS, DASH). As one example, if the adproxy 104 determines that a high quality ad should be presented according to the user preferences (e.g., a signed up premium content user) the adproxy may recommend that it would be more expeditious for the player 100 to stream the ad directly from the adserver 105 rather than it be proxied by the DSM 201. Similarly, if timing or bandwidth of delivery is not critical, the adserver may recommend that the DSM 201 proxy the streaming of media content to the player 100.

At step 316, the Player receives the manifest 450 from the DSM 201. At this time the player 100 is ready to resolve the single stream(s) 432 against the content server (the origin) 106 and the adserver 105. The single stream(s) provide indication for rendering the personalized content from the content/ad servers. Each single stream is unique in that it cannot be easily unparsed to separate out inserted content (e.g, ads) from media content. This prevents adblockers from reaching into a stream and cutting out a clip, for example, splicing the reference ad 421 from the video content. Also recall in the previous step, that the DSM 201 stitched the personalized content identified in the encoded playlist 430 for delivery into one single stream rather than requiring the player 100 to perform the stitching. In such regard, the DSM 201 presents the manifest 450 for the playlist with ads already inserted and embedded for delivery as a single stream.

Figure 3B:
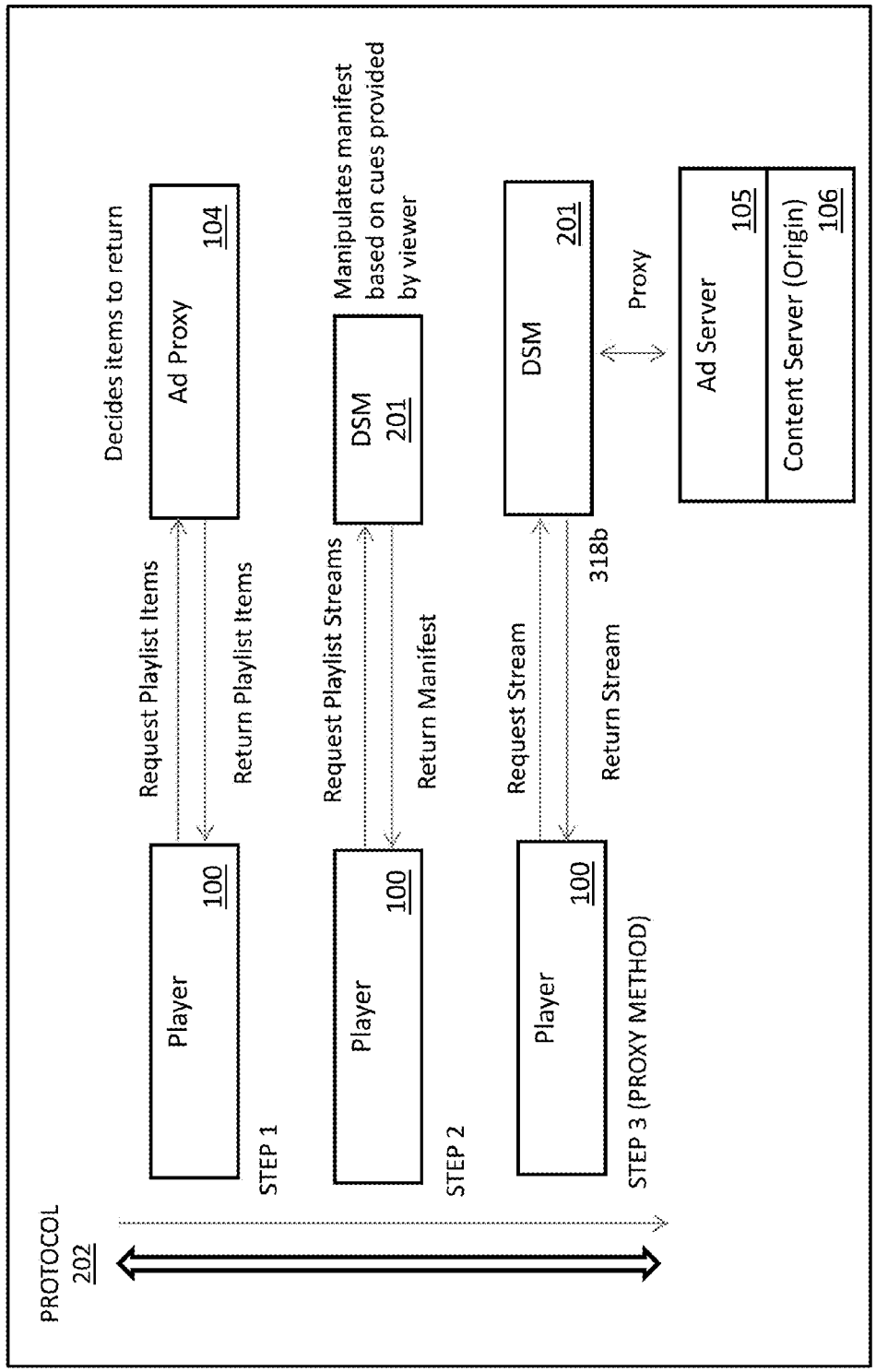
FIG. 3B illustrates a sequence diagram of a proxy method for dynamically rendering streaming content by way of the system in accordance with one exemplary embodiment.
Figure 4A:
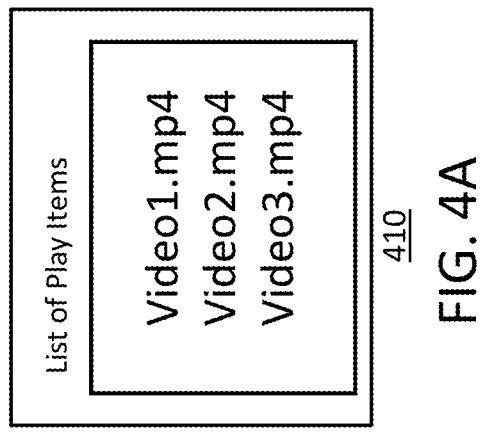
FIG. 4A is an exemplary list of play items in accordance with one embodiment.
Figure 4B:
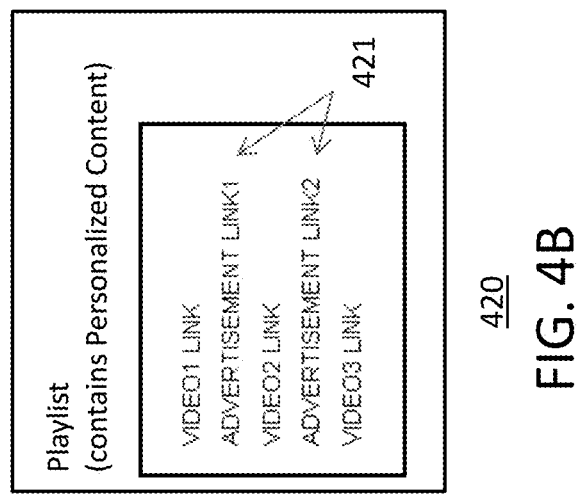
FIG. 4B is an exemplary playlist in accordance with one embodiment.

Following receipt of the manifest 440, the player 100 either retrieves the media content via a redirect method or a proxy method as previously noted. Briefly, FIG. 3A illustrates the "proxy method". FIG. 3B illustrates the "redirect method". The two methods differ primarily in their manner of stream delivery, as shown in step 318*a* and 318*b*; the preceeding steps are the same. In both cases, the adserver 105 and the content server 106 fulfill the delivery of media content. The DSM 201, when it created the manifest in the earlier step, included in the manifest 440 indication on whether to 1) redirect a presentation of the personalized content through the player 100, such that the player 100, upon receiving the manifest 440 from the DSM 201, resolves the manifest 440 against the content server 106 and the adserver 105 for delivery of the personalized content and the at least one inserted ad reference, or 2) proxy a presentation of the personalized content to the player 100, such that the DSM 201 streams to the player the personalized content and the at least one inserted ad reference from the content server 106 and the adserver 105. In the later, the DSM 201 retrieves the mediate content from the content server 106 and the adserver 105 to fulfill the content requested by the player 100. In the former, the player 100 communicates directly with the content server 106 and the adserver 105 to receive streaming of the personalized content.

It should also be noted that the player 100 during the rendering of the personal content at step 316 can also receive updates to the manifest. For instance, the DSM 201 can update the manifest in accordance with one or more parameters to change the personalized content presented to the player during rendering, where the one or more parameters include one of a time line, a start time, an end time, a time order, a time priority, a time period, a duration and a priority level. Although these parameters were also used during the initial creation, they may be dynamically updated as recommendations are provided by the adproxy 104. For example, referring to FIG. 4C, it can be seen that the encoded playlist 430 provided to the DSM 201 includes, for example, time stamp information (i.e., &vbegin, &vend). This time information is included during the aforementioned translation to the manifest 440.

By way of the novel method and system disclosed herein, and in its various embodiments, a solution has been provided to address the difficulties encountered in simultaneous deployment and management of content delivery, and more specifically, dynamic content insertion amongst various streaming protocols currently in use (HLS, HDS, ISS, DASH). The system 200, including DSM 201 and protocol 202, address the difficulty of 1:1 targeting in ABR streaming to present individual viewers with personalised streams, for instance advertisement combined with a program, on a large scale in a unified way. And, as ABR streaming becomes more and more prevalent, it is expected that the solution for this problem will become more and more valuable; namely, given one use-cases for 1:1 targeting is advertisement.

Figure 5:
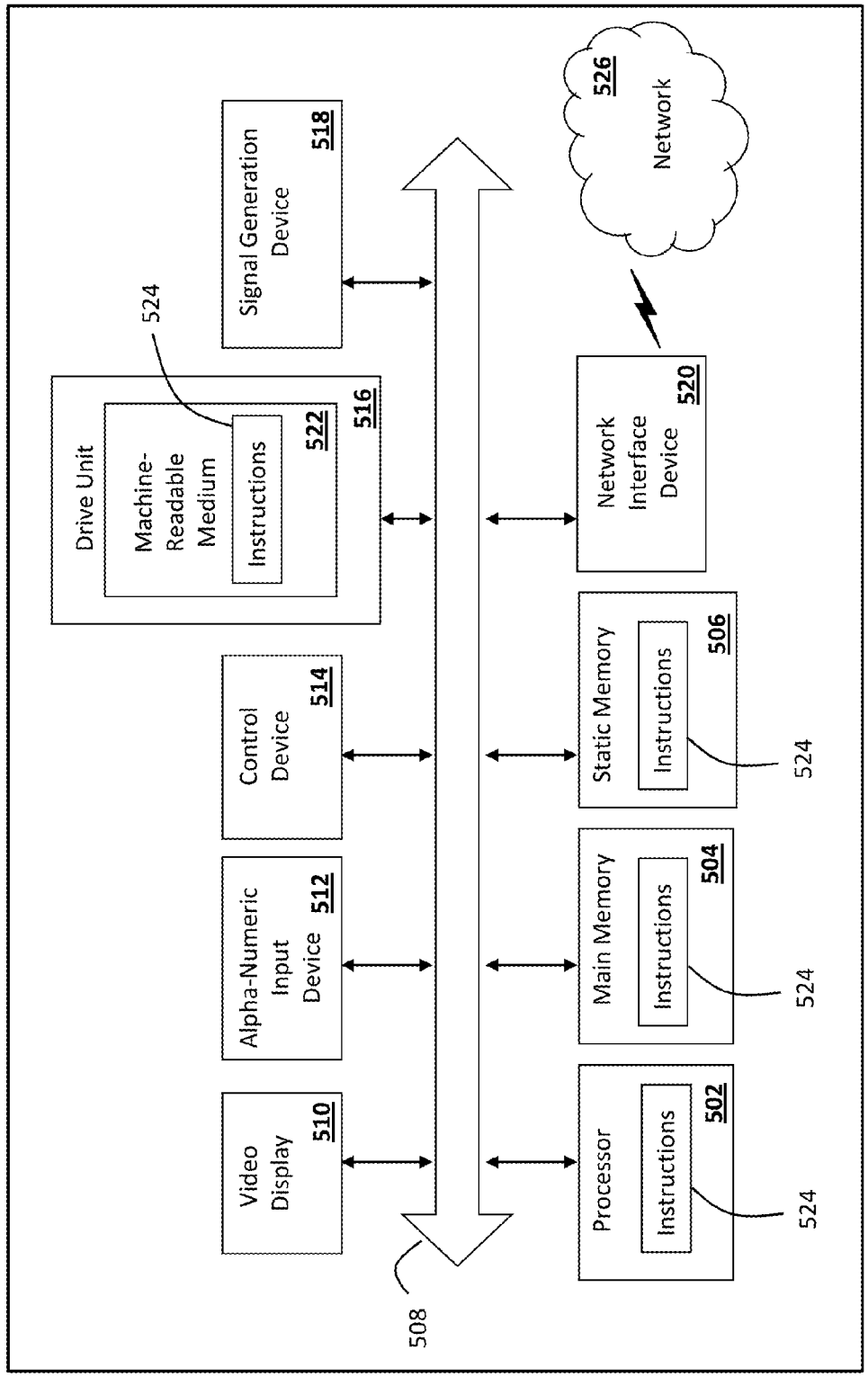
FIG. 5 is a diagrammatic representation of a machine in the form of a computer system within which a set of instructions, when executed, may cause the machine to perform any one or more of the methodologies discussed herein.

FIG. 5 depicts an exemplary diagrammatic representation of a machine in the form of a computer system 500 within which a set of instructions, when executed, may cause the machine to perform any one or more of the methodologies (or protocols) discussed above. In some embodiments, the machine operates as a standalone device. In some embodiments, the machine may be connected (e.g., using a network 526) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 500 may include a processor 502 (e.g., a central processing unit (CPU), a graphics processing unit (GPU, or both), a main memory 504 and a static memory 506, which communicate with each other via a bus 508. The computer system 500 may further include a video display unit 510 (e.g., a liquid crystal display (LCD), a flat panel, a solid state display, OLED). The computer system 500 may include an input device 512 (e.g., a keyboard), a control device 514 (e.g., a mouse), a mass storage medium 516, a signal generation device 518 (e.g., a speaker or remote control) and a network interface device 520.

The mass storage medium 516 may include a computer-readable storage medium 522 on which is stored one or more sets of instructions (e.g., software 524) embodying any one or more of the methodologies or functions described herein, including those methods illustrated above. The computer-readable storage medium 522 can be an electromechanical medium such as a common disk drive, or a mass storage medium with no moving parts such as Flash or like non-volatile memories. The instructions 524 may also reside, completely or at least partially, within the main memory 504, the static memory 506, and/or within the processor 502 during execution thereof by the computer system 500. The main memory 504 and the processor 502 also may constitute computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived there from, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Where applicable, the present embodiments of the invention can be realized in hardware, software or a combination of hardware and software. Any kind of computer system or other apparatus adapted for carrying out the methods described herein are suitable. A typical combination of hardware and software can be a portable communications device with a computer program that, when being loaded and executed, can control the portable communications device such that it carries out the methods described herein. Portions of the present method and system may also be embedded in a computer program product, which comprises all the features enabling the implementation of the methods described herein and which when loaded in a computer system, is able to carry out these methods.

While the preferred embodiments of the invention have been illustrated and described, it will be clear that the embodiments are not so limited. Numerous modifications, changes, variations, substitutions and equivalents will occur to those skilled in the art without departing from the spirit and scope of the present embodiments of the invention as defined by the appended claims.

What is claimed is:

1. A method of dynamically rendering streaming content, comprising the steps of:
   requesting through a player a personalized and targeted delivery of play list items from an adproxy, where the requesting includes: i) inquiring the player for user profile information and ii) providing the user profile information with the request to the adproxy for the personalized and targeted delivery of the play list items;
   returning by way of the adproxy to the player, a playlist of the personalized and targeted delivery of play list items responsive to the requesting in a Synchronized Multimedia Integration Language (SMIL), where the playlist includes a personalized content having at least one inserted ad reference;
   by way of the player, creating a base 64 encoded playlist from the playlist received from the adproxy and communicating the base 64 encoded playlist in a request to a dynamic stitching module for translation of the encoded playlist into a manifest, where the dynamic stitching module creates from the base 64 encoded playlist the manifest specific to the player for rendering a personalized content on the player; and providing the manifest to the player that resolves one or more streams identified in the manifest against a content server and an adserver for delivery of the personalized content,
   where the dynamic stitching module (DSM) performs the steps of
      presenting the manifest for the playlist with the at least one inserted ad reference already inserted and embedded for delivery as a single stream to the player, and
      preventing ad blockers from reaching into the manifest and splicing out the at least one inserted ad reference by
         translating the base 64 encoded playlist with the at least one inserted ad reference into the manifest which combines the play list items in the playlist into one content stream for delivery.

2. The method of claim 1, where the player requests and receives, from the adproxy, decision for advertisement insertion in the personalized content based on the user profile information, where the DSM module resolves the base 64 encoded playlist returned from the adproxy in a Synchronized Multimedia Integration Language (SMIL) format and presents it as the single content stream.

3. The method of claim 2, where the player requests from the adproxy a recommended content for the play list items in the Synchronized Multimedia Integration Language (SMIL) format according to the user profile information.

4. The method of claim 1,
   where an ad plug-in takes each link in the base 64 encoded playlist and combines them together to create a parseable URL string that is communicated to the dynamic stitching module;
   where the dynamic stitching module redirects a presentation of the personalized content through the player, such that the player, upon receiving the manifest from the dynamic stitching module, resolves the manifest for delivery of the personalized content and the at least one inserted ad reference.

5. The method of claim 1, where the dynamic stitching module proxies a presentation of the personalized content to the player, such that the dynamic stitching module streams to the player the personalized content and the at least one inserted ad reference from the content server and the adserver.

6. The method of claim 1, where the dynamic stitching module presents the manifest for the playlist with ads already inserted and embedded for delivery as a single stream.

7. The method of claim 1, where the step of communicating the encoded playlist in a request to the dynamic stitching module identifies the player and rendering formats supported by the player.

8. The method of claim 1, where the dynamic stitching module translates the encoded playlist into a manifest that combines the play list items in the playlist for delivery into one content stream.

9. The method of claim 1, further comprising adding a filename extension onto the encoded playlist to inform the dynamic stitching module of a media format type supported by the player.

10. The method of claim 1, where the player creates the encoded playlist with Uniform Resource Locators (URLs) that fetch the personalized content and the at least one inserted ad reference.

11. The method of claim 1, further comprising directing the player to
    provide a static user selection of play list items presented to a user, or
    retrieve a dynamic selection of combined play list items presented to the user.

12. The method of claim 1, further comprising, on the dynamic stitching module, dynamically inserting links to advertisements in the manifest during a live streaming or video on demand streaming.

13. The method of claim 1, further comprising, on the dynamic stitching module, dynamically updating the manifest in accordance with one or more parameters to change the personalized content presented to the player during rendering, where the one or more parameters include one of a time line, a start time, an end time, a time order, a time priority, a time period, a duration and a priority level.

14. The method of claim 1, where the dynamic stitching module presents the manifest for the playlist with ads already inserted and embedded for delivery as a single stream.

15. The method of claim 1, where the dynamic stitching module translates the encoded playlist into a manifest that combines the play list items in the playlist for delivery into one content stream.

16. The method of claim 1, where the step of creating the encoded playlist converts characters of strings in the playlist into a parseable URL string that is the request to the dynamic stitching module.

17. A system for dynamically rendering streaming content, the system comprising:
a protocol; and
a dynamic stitching module, that through implementation of the protocol by a player communicatively coupled thereto, provides a personalized and targeted delivery of play list items from an adproxy responsive to a request made by the player that prevents adblockers from splicing out at least one inserted ad reference,
where the protocol: i) inquires the player for user profile information and ii) provides the user profile information with the request to the adproxy for the personalized and targeted delivery of play list items,
where, by way of the protocol, the player:
receives from the adproxy a playlist of the personalized and targeted delivery of the play list items responsive to the requesting, where the playlist includes a personalized content having the least one inserted ad reference;
creates a base 64 encoded playlist in the Synchronized Multimedia Integration Language (SMIL) from the playlist received from the adproxy; and
communicates the base 64 encoded playlist in a request to the dynamic stitching module,
where the dynamic stitching module translates the base 64 encoded playlist into a manifest file that is specific to the player for rendering the personalized content on the player, and provides the manifest file to the player to resolve one or more manifest streams against a content server and an adserver for delivery of the personalized content,
where the dynamic stitching module is communicatively coupled directly or indirectly to the adproxy, the adserver and the content server in accordance with a proxy mode or redirect mode
where the dynamic stitching module (DSM) presents the manifest for the playlist with the at least one inserted ad reference embedded for delivery as a single stream to the player by translating the base 64 encoded playlist into the manifest which combines the play list items in the playlist into one content stream for delivery that prevents adblockers from reaching into the single stream and splicing out the at least one inserted ad reference.

18. The system of claim 17, where,
in the redirect mode, the dynamic stitching module redirects a presentation of the personalized content through the player, such that the player, upon receiving the manifest file from the dynamic stitching module, resolves the manifest file against the content server and the adserver for delivery of the personalized content and the at least one inserted ad reference, and
in the proxy mode, the dynamic stitching module proxies a presentation of the personalized content to the player, such that the dynamic stitching module streams to the player the personalized content and the at least one inserted ad reference from the content server and the adserver.

19. The system of claim 17, where the player is communicatively coupled to an ad plug-in that by way of the protocol signals the dynamic stitching module with the encoded playlist in the Synchronized Multimedia Integration Language (SMIL), whereby the encoded playlist prevents adblockers from reaching into the single stream and splicing out the at least one inserted ad reference.

20. The system of claim 17, where the dynamic stitching module stitches the personalized content identified in base 64 encoded playlist for delivery into one single stream to the player rather than requiring the player to perform said stitching thereby preventing adblockers from reaching into a stream and cutting out a media content clip.

21. The system of claim 20, wherein the dynamic stitching module stitches the play list items in the base 64 encoded SMIL format into the manifest file that can be played back by the player as a single stream, where the base 64 encoded SMIL is delivered in a URL string used as inquiry to the DSM.

* * * * *